United States Patent
Friedmann et al.

(10) Patent No.: US 6,428,092 B1
(45) Date of Patent: Aug. 6, 2002

(54) DEVICE FOR MOVING A PART, ESPECIALLY IN A MOTOR VEHICLE, SAID DEVICE HAVING AN ADJUSTING MECHANISM

(75) Inventors: Artur Friedmann, Lichtenau; Peter Steuer, Karlsruhe; Stefan Boell, Illmensee, all of (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/581,349

(22) PCT Filed: Jul. 2, 1999

(86) PCT No.: PCT/DE99/02047

§ 371 (c)(1),
(2), (4) Date: Jul. 28, 2000

(87) PCT Pub. No.: WO00/22322

PCT Pub. Date: Apr. 20, 2000

(30) Foreign Application Priority Data

Oct. 13, 1998 (DE) .......................................... 198 47 016

(51) Int. Cl.$^7$ ............................................... B60J 7/057
(52) U.S. Cl. ........................................ 296/223; 74/405
(58) Field of Search ............................ 296/223; 74/405

(56) References Cited

U.S. PATENT DOCUMENTS

| | | | | |
|---|---|---|---|---|
| 907,940 A | * | 12/1908 | Zachow et al. ................ 74/405 |
| 1,196,311 A | * | 8/1916 | Stinson ........................ 74/405 |
| 1,566,924 A | * | 12/1925 | Robertson ................ 74/405 X |
| 2,311,393 A | * | 2/1943 | Honeywell ................ 74/405 X |
| 2,966,069 A | | 12/1960 | Wise ........................... 74/424.8 |
| 3,926,532 A | * | 12/1975 | Schlenker et al. ........... 403/322 |
| 3,937,096 A | * | 2/1976 | Lundin et al. ................ 74/405 |
| 4,274,293 A | | 6/1981 | Ruger ........................ 74/89.15 |
| 4,420,185 A | * | 12/1983 | Bienert et al. .............. 296/223 |
| 4,561,691 A | | 12/1985 | Kawai ..................... 296/223 X |
| 5,069,502 A | * | 12/1991 | Sekine et al. ................ 296/223 |
| 5,612,600 A | * | 3/1997 | Bratkowski et al. ...... 296/223 X |
| 5,797,648 A | * | 8/1998 | Fiegel et al. ................. 296/223 |

FOREIGN PATENT DOCUMENTS

| | | | | |
|---|---|---|---|---|
| DE | 3529753 | * | 1/1987 | .................. 296/223 |
| DE | 93 11 960 U | | 12/1994 | |
| EP | 0 469 286 A | | 2/1992 | |
| EP | 622260 | * | 11/1994 | .................. 296/223 |
| EP | 0 795 699 A | | 9/1997 | |
| FR | 699087 | * | 2/1931 | .................. 74/405 |
| GB | 1592312 | * | 7/1981 | .................. 296/223 |
| JP | 406106984 | * | 4/1994 | .................. 296/223 |

OTHER PUBLICATIONS

Translation of French patent document 699087, published Feb. 10, 1931.*

* cited by examiner

*Primary Examiner*—Dennis H. Pedder
(74) *Attorney, Agent, or Firm*—Michael J. Striker

(57) ABSTRACT

An apparatus for moving a part, in particular in a motor vehicle, with an adjusting mechanism that has a motor (10), a gear (12), and at least power takeoff part (14) which is operatively connected to the part (16) to be moved, characterized in that the power takeoff part (14) is supported separately from the gear (12).

10 Claims, 3 Drawing Sheets

DEVICE FOR MOVING A PART, ESPECIALLY IN A MOTOR VEHICLE, SAID DEVICE HAVING AN ADJUSTING MECHANISM

PRIOR ART

The invention relates to an apparatus for moving a part, in particular in a motor vehicle, with an adjusting mechanism as generically defined by the preamble to the main claim.

Such apparatuses are widely known; the mechanical components are increasingly being supplemented with electric motor components. In this way, sliding roofs in motor vehicles, for instance, can be opened and closed electrically, which as a rule is done with the aid of geared motor that is coupled to the sliding roof via a riser helix. In the known versions for this purpose, the coupling of the geared motor to the riser helix is done via a gear wheel that is solidly connected to the gear unit and that drives the riser helix. For assembly, the gear wheel seated on the gear unit must be made to engage the riser helix that is already installed in the motor vehicle; this is often difficult to do in terms of manipulation and entails unavoidable and undesirable tolerances. For instance, tilting or axial offsets can occur, which impair the meshing of the teeth. There is often also undesired and irritating noise as a result.

Such problems are also known in other systems, in which an electric motor adjusting mechanism must cooperate on the one hand with movable parts that have not yet been installed and on the other with preinstalled parts that are solid with the auto body.

ADVANTAGES OF THE INVENTION

The apparatus according to the invention having the characteristics of the main claim has the advantage that the association of the power takeoff part with the part to be moved is improved; this leads to greater running smoothness and an attendant noise abatement, as well as reducing wear.

Because of the separate bearing of the power takeoff part, which otherwise is usually disposed on a gear member, the meshing conditions can be optimized. Because of the defined installation, for instance into a frame that is solid with the auto body, the power takeoff part can be adapted with very low tolerances to the part to be moved. This pertains both to tolerances that are due substantially to bearing plays, deviations from concentricity, and eccentricities, and tolerances in terms of the axial association of the power takeoff part with the part to be moved, which are primarily due to assembly-related factors.

Furthermore, assembly or the removal and installation of the motor or gear if repair becomes necessary are facilitated substantially, because the power takeoff part can remain in connection with the part to be moved.

By the provisions recited in the dependent claims, advantageous refinements of the apparatus of the main claim are possible.

For instance, it is advantageous if the coupling of the power takeoff part to a gear member is effected via an indentation that is recessed in the power takeoff part. With respect to its geometry, the indentation can be embodied in various ways, for instance hexagonally; the only decisive factor is that a positive connection with an extension corresponding to the indentation being made; the extension is formed with suitable geometry on the end of the gear member toward the indentation.

For coupling the power takeoff part to the gear member, it is also possible conversely for the indentation to be embodied on the gear member and the extension to be embodied on the power takeoff part. This reversal changes nothing in terms of the described coupling principle.

A crowned extension has the advantage that slight tilting, dictated by assembly, in the axis of the gear member relative to the axis of the power takeoff part are possible without leading an impairment of the meshing performance.

If the part to be moved is a sliding roof of a motor vehicle and the roof is operatively connected to the power takeoff part via a riser helix, and furthermore if the power takeoff part is formed by a gear wheel that drives the riser helix and meshes with contrarily movable portions of the riser helix, then all the above-described advantages are obtained, even in the case of a special apparatus for opening and closing a sliding roof.

It is advantageous if the gear wheel meshing with the riser helix is retained on its side remote from the connecting point by a sheet-metal spring and is pressed by this sheet-metal spring against a bearing bush that in turn is retained in a roof frame that is solid with the auto body. As a result, not only is an optimal fixation of the gear wheel in the bearing bush attained, but at the same time assembly becomes very simple.

The bearing bush is retained in an opening in the roof frame whose center point ideally has precisely equal spacings from two walls of the roof frame that guide the riser helix. It is thus assured that the bearing bush and the gear wheel supported in it are each disposed with equal spacing from contrarily movable portions of the riser helix.

In a further advantageous feature, the sheet-metal spring has a collar, which embraces a side face of a concentric extension, on the side of the gear wheel remote from the connecting point.

This fixes the sheet-metal spring relative to the gear wheel. If furthermore the sheet-metal spring, with its outer peripheral regions, partly embraces the two portions of the riser helix transversely to its running direction, then guidance and fixation of, these portions of the riser helix relative to the gear wheel are also assured.

By a suitable choice of material for the sheet-metal spring, specific conditions at the installation location can be reacted to. The use of hardened sheet steel minimizes wear, while light metals contribute to reducing weight.

The disposition of an elastic element between the extension and the indentation is also advantageous. By means of this element, which by way of example is made from a soft plastic or a rubberlike material, acoustic decoupling can be achieved. The elastic element can be applied to the extension in the form of a coating, so that then, as before, a direct connection still exists between the extension and the indentation. However, an indirect connection via a suitably shaped elastic intermediate member that is disposed between the extension and the indentation is also conceivable.

By the separation of the power takeoff part and the gear as described, still other provisions for acoustic decoupling of the motor from corresponding auto body parts can also be better realized. If the complete gear unit is suspended from elastic decoupling elements, then because of the elastic suspension the motor and gear unit can execute motions relative to the auto body parts. However, these motions do not then adversely affect the meshing performance of the power takeoff part with the part to be moved, since the power takeoff part remains firmly associated with the corresponding auto body part.

It is understood that the use of the apparatus according to the invention is not limited only to sliding roofs. It can be utilized for all problems of adjustment in the automotive field, for instance with electric window controls, seat adjusters, aids in closing the most various auto body openings, such as the trunk lid and the engine hood, or headlight and steering wheel adjusters.

DRAWING

Two exemplary embodiments of an apparatus according to the invention are shown in the drawing and described in further detail below.

Figure 3:
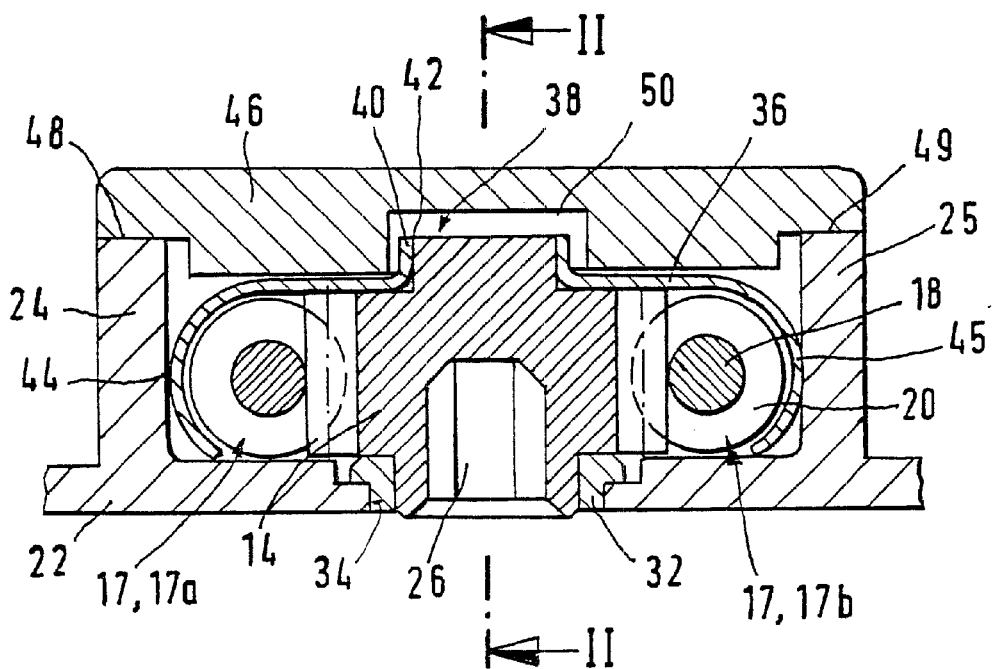
FIG. 3 is a section taken along the line I—I of FIG. 1.
Figure 3:
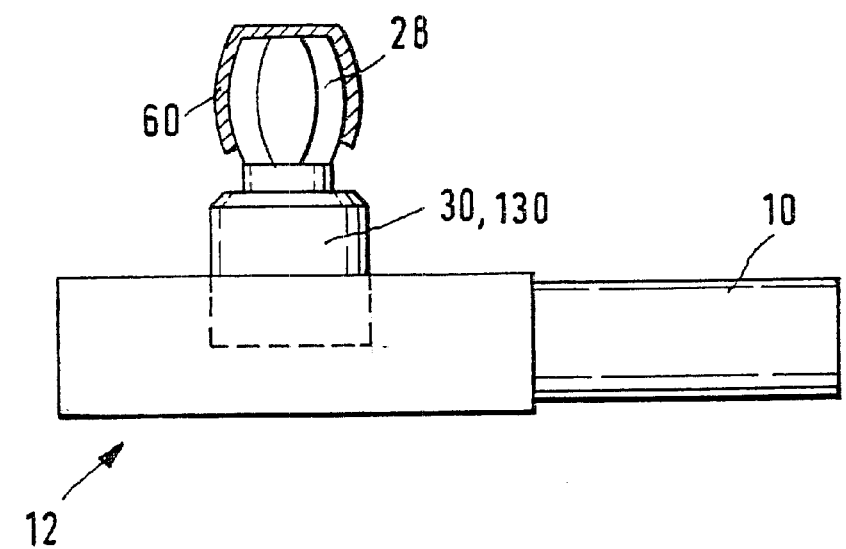
Figure 5:
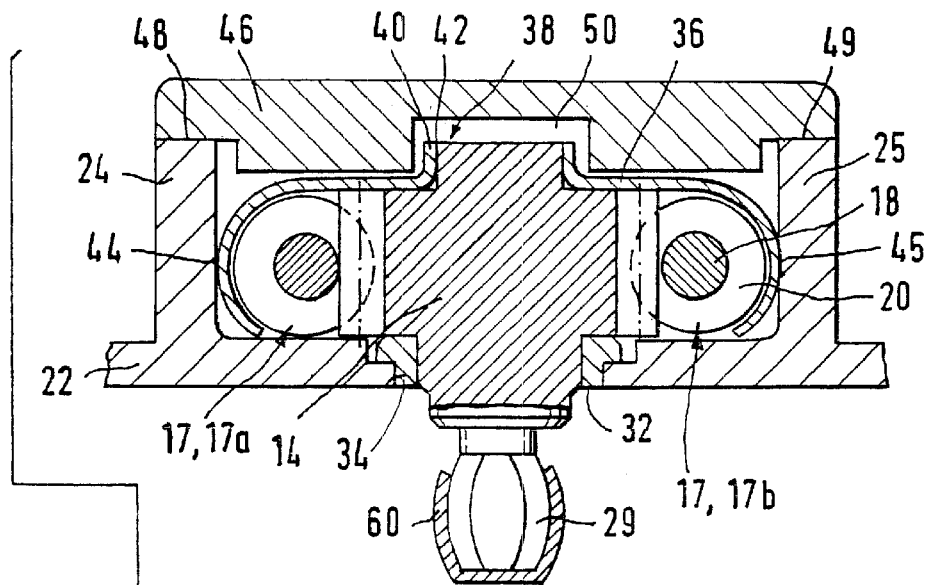
Figure 5:
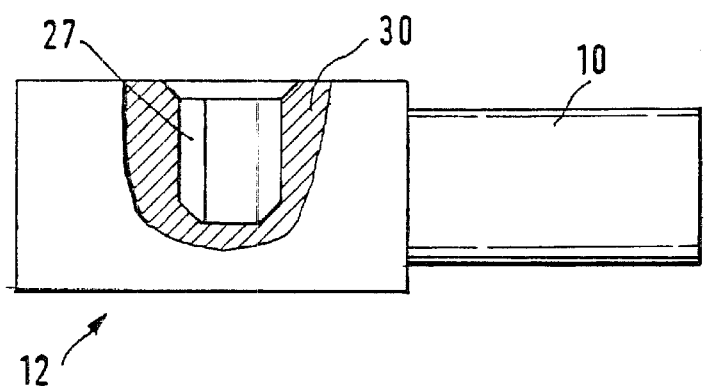

and FIG. 5 shows a second exemplary embodiment, in the same view as FIG. 3.

DESCRIPTION OF THE EXEMPLARY EMBODIMENTS

Figure 1:
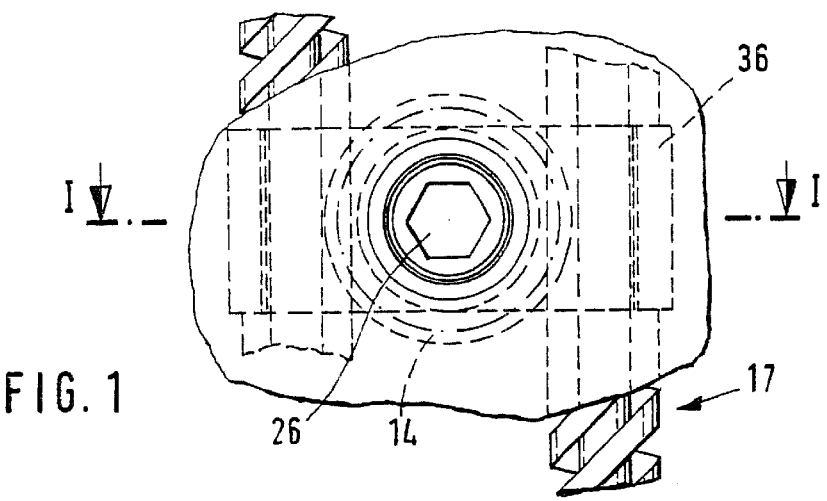
FIG. 1 shows an exemplary embodiment in plan view from above.
Figure 2:
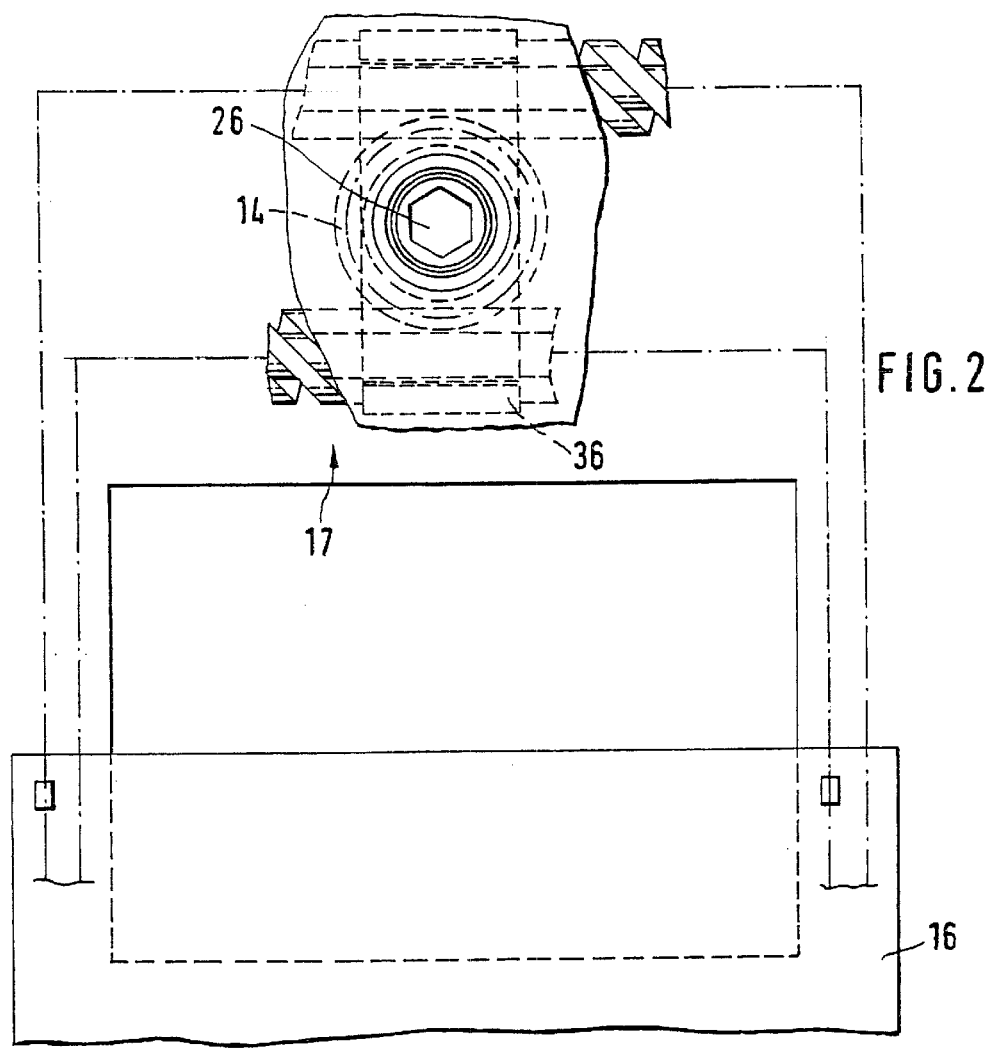
FIG. 2 shows a schematic an augmented view of FIG. 1.

The exemplary embodiment shown in FIGS. 1–3 shows part of an apparatus according to the invention for moving a part, in particular in a motor vehicle, with an adjusting mechanism; the exemplary embodiment pertains in particular to an apparatus for opening and closing a sliding roof 16.

The apparatus includes an adjusting mechanism with a motor 10, a gear 12, and a power takeoff part 14 that is connected to the part 16 to be moved. The power takeoff part is formed by a gear wheel 14, and the part to be moved is a sliding roof 16, which is operatively connected to the power takeoff part 14 via a riser helix 17.

The riser helix 17 comprises a flexible steel cable 18, which absorbs the tensile forces that occur in the opening and closing of the sliding roof 16. This steel cable 18 is surrounded by a spiral coil 20, with which the gear wheel 14 comes to mesh at two opposed points. The riser helix 17 and the gear wheel 14 are supported in a roof frame 22, which is associated with a roof system solid with the auto body.

The roof frame 22, which comprises a preferably lightweight and stable material, such as aluminum, has two guide walls 24, 25. Inside the space defined by the guide walls 24, 25, the riser helix 17 is guided between the left guide wall 24 and the gear wheel 14 on the one hand and the right guide wall 25 and the gear wheel 14 on the other. As a result of this arrangement and the rotation of the gear wheel 14, a contrary motion of two portions 17a and 17b of the riser helix 17 is attained.

On its end toward the gear 12, the gear wheel 14 has an indentation 26, into which a preferably crowned extension 28 that is formed onto a gear member 30 can be inserted with positive engagement; the gear member 30 is formed, in the exemplary embodiment shown, by a gear shaft 130.

Unlike the first exemplary embodiment, the gear wheel 14 in the second exemplary embodiment of FIG. 5 has no indentation but instead an also preferably crowned extension 29. This extension 29 can be inserted positively into an indentation 27 of the gear member 30.

In both exemplary embodiments, the gear wheel 14 is supported in a bearing bush 32. This bearing bush 32 is retained in an opening 34 of the roof frame 22. The opening 34 is disposed such that its center point has equal spacing from each of the guide walls 24, 25.

On its upper side, the gear wheel 14 is pressed against the bearing bush 32 and held in it by a sheet-metal spring 36, which is preferably made from hardened sheet steel. The sheet-metal spring 36 has an opening 38, which is provided with a collar 40 that encompasses the opening 38. The inside surface of this collar 40 is in contact with the side face of a concentric extension 42 of the gear wheel 14, and as a result the sheet-metal spring 35 is fixed relative to the gear wheel 14.

In addition, the sheet-metal spring 36 is embodied such that with its outer peripheral regions 44, 45, it partly embraces the riser helix 17 transversely to the running direction of the riser helix. As a result, in the meshing region, fixation and guidance of the riser helix 17 relative to the gear wheel 14 are obtained.

Both the sheet-metal spring 36 and the gear wheel 14 are pressed in the direction of the bearing bush 32 and thus retained by a fastening element 46. This element rests with two shoulders 48 and 49 on the guide walls 24 and 25, and in its center it has an indentation 50, into which the collar 40 of the sheet-metal spring 36 and the extension 42 of the gear wheel 14 protrude.

Figure 4:
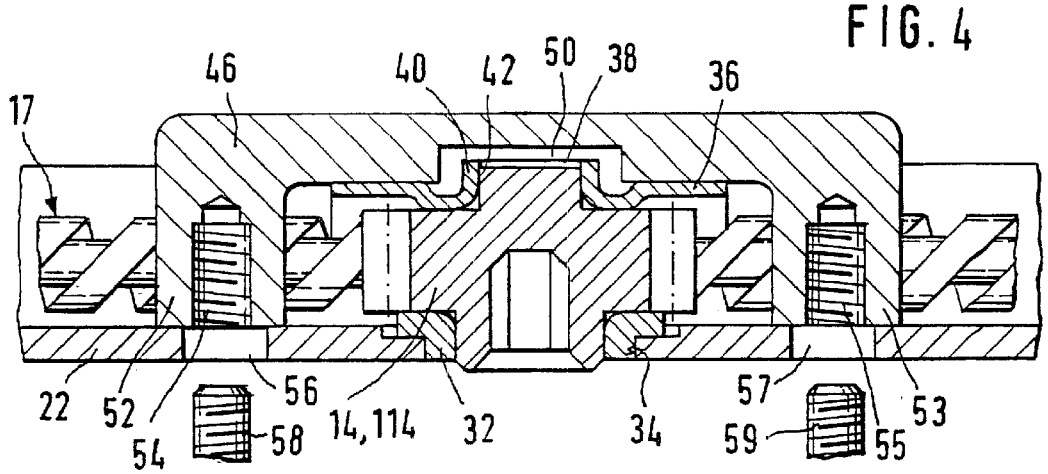
FIG. 4 is a section taken along the line II—II of FIG. 3.

In addition, as shown in FIG. 4, in the longitudinal direction or direction of motion of the riser helix 17, two walls 52 and 53 are formed onto the two ends of the fastening element 46; each wall has a respective threaded bore 54 and 55 and comes to rest in the installed state coaxially above corresponding bores 56 and 57 of the roof frame 22. The adjusting mechanism is put together and intrinsically fixed with at least two screws 58 and 59, associated with a motor housing and screwed through the bores 56, 57 into the threaded bores 54, 55.

In both exemplary embodiments of FIGS. 3 and 5, the respective extension 28 and 29 is coated with an elastic element 60 for the sake of acoustic decoupling.

In a variation from what is shown in the exemplary embodiments, the pitch of the riser helix 17 can be slighter. The possibility also exists of embodying the windings as individual rings.

The apparatus of the invention is not limited to sliding roof drive mechanisms. For instance in a window control drive, the gear shaft 130 can mesh with the drive mechanism coupled with a window pane. The apparatus of the invention can also be used in adjusting systems such as for seat adjustment. In that case, a drive spindle can for instance engage an indentation in the gear of the drive motor.

What is claimed is:

1. An apparatus for moving a part in a motor vehicle, with an adjusting mechanism that has a motor (10), a gear (12), and at least one power takeoff part (14) which is operatively connected to the part (16) to be moved, characterized in that the at least one power takeoff part (14) is separable from the gear (12), wherein the at least one power takeoff part (14) has an indentation (26) and a gear member (30) of the gear (12) has an extension (28) corresponding to the indentation (26), wherein said extension (28) has a bulged portion, and wherein said at least one power takeoff part (14) is retained by a sheet-metal spring (36) and is pressed counter to a bearing bush (32) that is retained in an opening (34) of a roof frame (22).

2. An apparatus for moving a part in a motor vehicle, with an adjusting mechanism that has a motor (10), a gear (12), and at least power takeoff part (14) which is operatively connected to the part (16) to be moved, characterized in that the power takeoff part (14) is separable from the gear (12), wherein the part to be moved is a sliding roof (16), said sliding roof connected to the power takeoff part (14) via a riser helix (17), wherein the power takeoff part is a gear wheel (14) which drives the riser helix (17) and meshes with contrarily movable portions (17a, 17b) of the riser helix (17), and wherein the gear wheel (14) is guided by a sheet-metal spring (36) disposed on a side remote from the gear (12) and is pressed counter to a bearing bush (32) that is retained in an opening (34) of a roof frame (22).

3. An apparatus for moving a part in a motor vehicle, with an adjusting mechanism that has a motor (10), a gear (12), and at least one power takeoff part (14) which is operatively connected to the part (16) to be moved, characterized in that the at least one power takeoff part (14) is separable from the gear (12), wherein the at least one power takeoff part (14) has an extension (29), and the gear member (30) of the gear (12) has an indentation (27) corresponding to the extension (29), wherein said extension (28, 29) has a bulged portion, and wherein said at least one power takeoff part (14) is retained by a sheet-metal spring (36) and is pressed counter to a bearing bush (32) that is retained in an opening (34) of a roof frame (22).

4. The apparatus of claim 2, characterized in that the power takeoff part (14) has an indentation (26), and a gear member (30) of the gear (12) has an extension (28) corresponding to the indentation (26).

5. The apparatus of claim 2, characterized in that the power takeoff part (14) has an extension (29), and the gear member (30) of the gear (12) has an indentation (27) corresponding to the extension (29).

6. The apparatus of claim 2, characterized in that the extension (28, 29) has a bulged portion.

7. The apparatus of claims 1, 2, or 3, characterized in that the part to be moved is a sliding roof (16), which is connected to the at least one power takeoff part (14) via a riser helix (17), and wherein the at least one power takeoff part is a gear wheel (14), which drives the riser helix (17) and meshes with contrarily movable portions (17a, 17b) of the riser helix (17).

8. The apparatus of claims 1, 2, or 3, characterized in that the sheet-metal spring (36) has an opening (38) with a collar (40) encompassing the opening (38).

9. The apparatus of claims 1, 2, or 3, characterized in that the sheet-metal spring (36) partly embraces the riser helix (17) transversely to the running direction of the riser helix.

10. The apparatus of claims 1, 2, or 3, characterized in that an elastic element (60) is disposed between the gear member (30) and the at least one power takeoff part (14).

* * * * *